Jan. 29, 1963  E. SAUER  3,075,439
PHOTOGRAPHIC CAMERA WITH COUPLED EXPOSURE METER
Filed Nov. 9, 1960  6 Sheets-Sheet 3

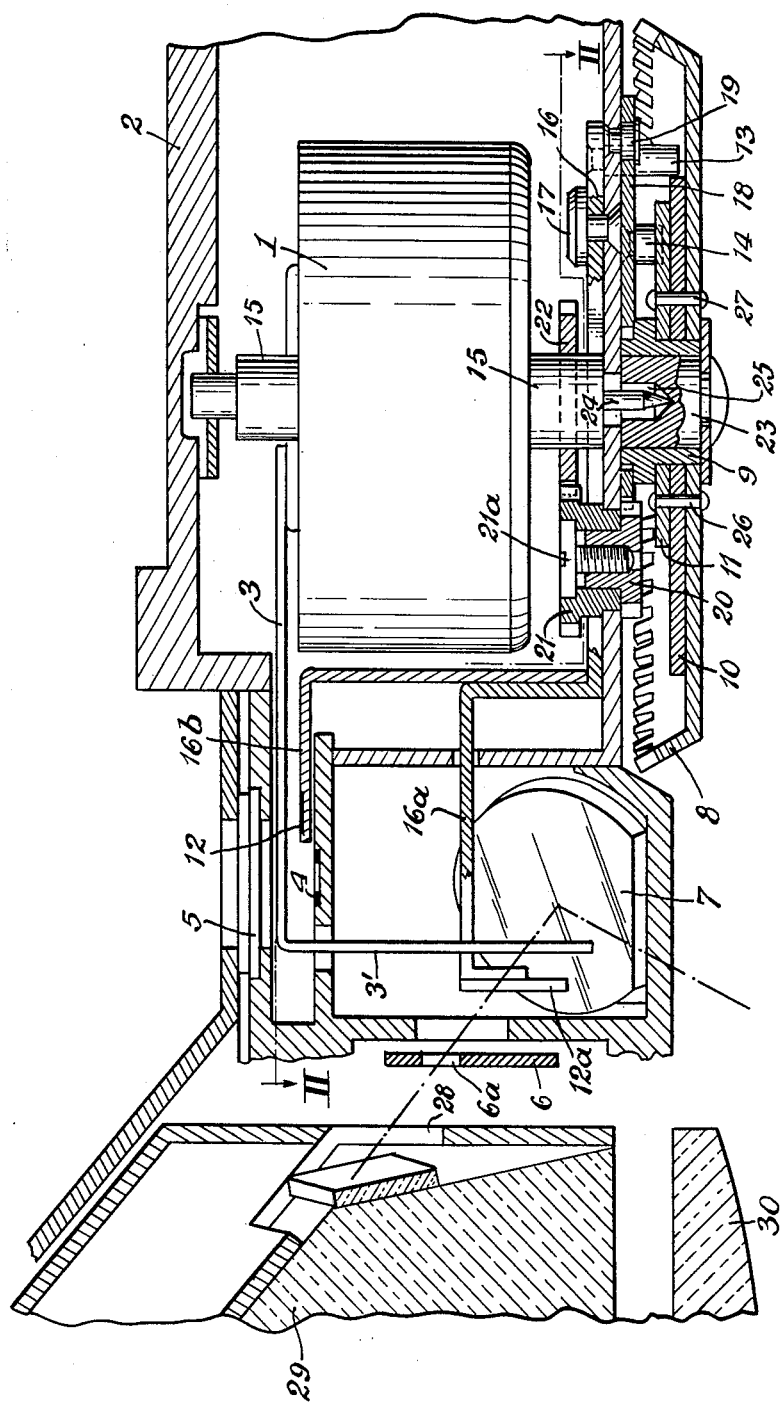

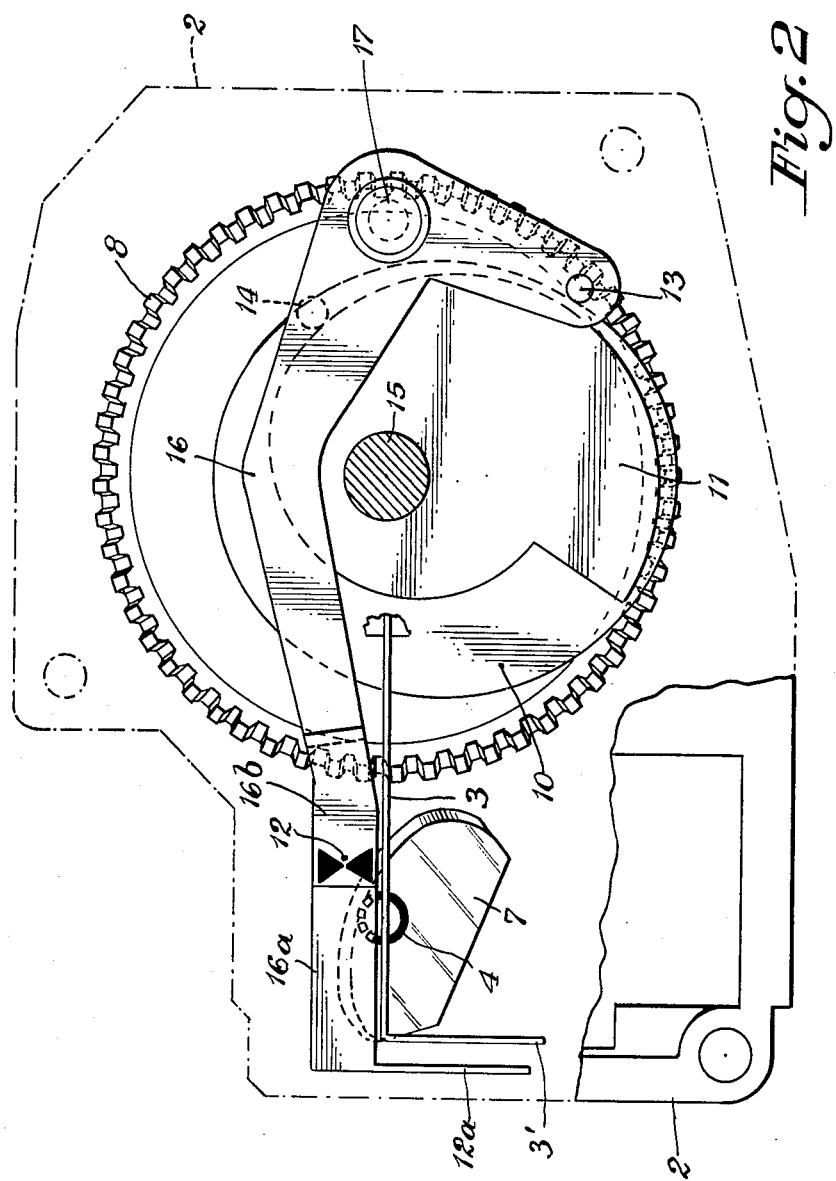

United States Patent Office 3,075,439
Patented Jan. 29, 1963

3,075,439
PHOTOGRAPHIC CAMERA WITH COUPLED EXPOSURE METER
Edgar Sauer, Stuttgart, Germany, assignor to Zeiss Ikon Aktiengesellschaft, Stuttgart, Germany
Filed Nov. 9, 1960, Ser. No. 68,289
8 Claims. (Cl. 95—10)

The invention relates to photographic cameras and particularly is directed to a photographic camera the exposure determining elements of which are coupled with a photoelectric exposure meter.

It is an object of the present invention to provide a photographic camera of the type mentioned with means for preventing an incorrect exposure of films and in particular of color films, even when the lighting conditions of subjects to be photographed are very different.

It is well known that in bad weather or when the subject to be photographed is illuminated from the rear it is necessary to take these conditions into account when determining the exposure to be made and that under such conditions it is necessary to prolong the exposure or to operate with a large diaphragm aperture. Furthermore, the exposure control devices of the camera have to be readjusted when filter factors are to be considered or when the film speed is changed. At any rate, there exists the possibility that a camera adjusted correctly for bad weather or for back-lighted subjects will remain in this adjusted condition when subsequently other exposures in good weather are made and the result, of course, is an incorrect exposure of the film. This matter of incorrect exposure is particularly critical when color films are being used in the camera. In addition thereto it is a disadvantage when in a camera adjusted for bad weather exposures the exposure devices are coupled with an exposure meter and when the viewfinder also permits a reading of the exposure meter, because in such a case the user of the camera is compelled to remove the camera from his eye for adjusting the camera exposure elements to an extended exposure.

The principal object of the invention is to provide such coupled cameras, particularly single lens mirror reflex cameras, with a view finder which not only shows the image of the subject to the photographer and an indication of the exposure meter, but also an image of a correcting mark which will indicate certain exposure extension factors and with which the pointer of the exposure meter will have to be brought into alignment in order to adjust the camera for a correct exposure. Preferably, such a correcting mark is displaced from the conventional compensating mark a distance which is equal to one complete scale division of the diaphragm scale.

In case it is desired to consider during the adjustment of the camera a plurality of additional correcting marks in order to make allowance, for instance, for a plurality of filter factors or film speeds or the like, then the present invention provides a number of correcting marks, each of which is displaced from the adjacent correcting mark a distance equal to one complete scale division of the diaphragm scale or light value scale.

The invention will now be described in connection with the accompanying drawing which shows a number of embodiments of the invention as follows:

FIG. 1 discloses a portion of a vertical sectional view of a single lens mirror reflex camera whose exposure meter is provided with a turn-back measuring instrument. The sectional view is taken in a plane parallel to the front wall of the camera casing.

FIG. 2 is a horizontal sectional view of that portion of the camera in which the measuring instrument of the exposure meter is arranged substantially along the broken line II—II of FIG. 1 and shows the tracking pins and cam discs and compensating marks.

FIGS. 4, 5, 6 and 7 shown each specific forms of the indicating marks and an arrangement of the compensating marks, particularly as they will appear in the view finder image or adjacent thereto.

Figure 8:
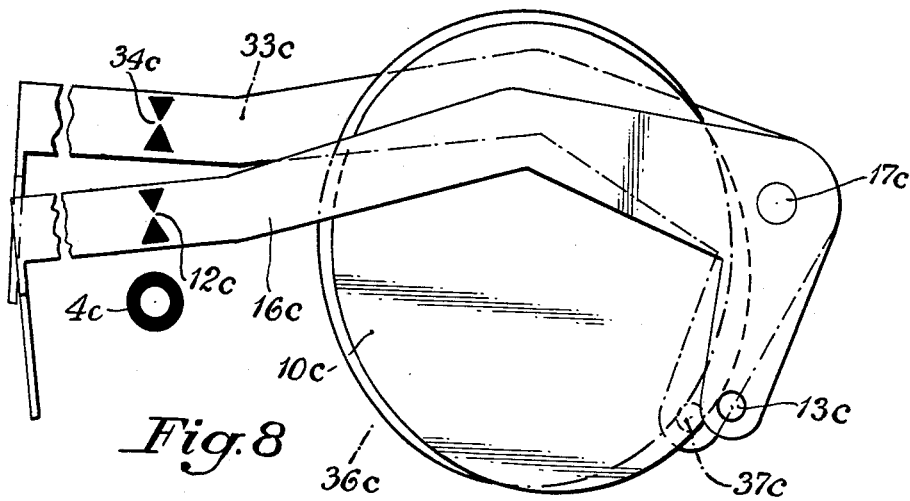
Figure 9:
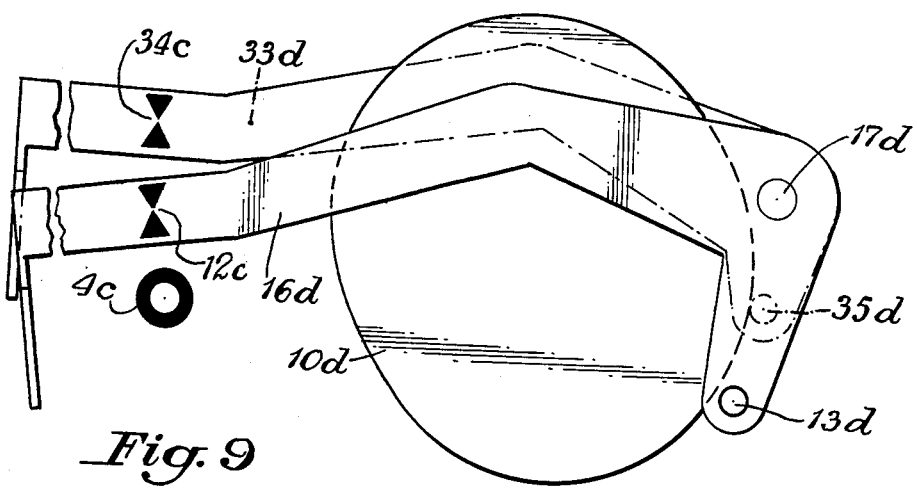
Figure 10:
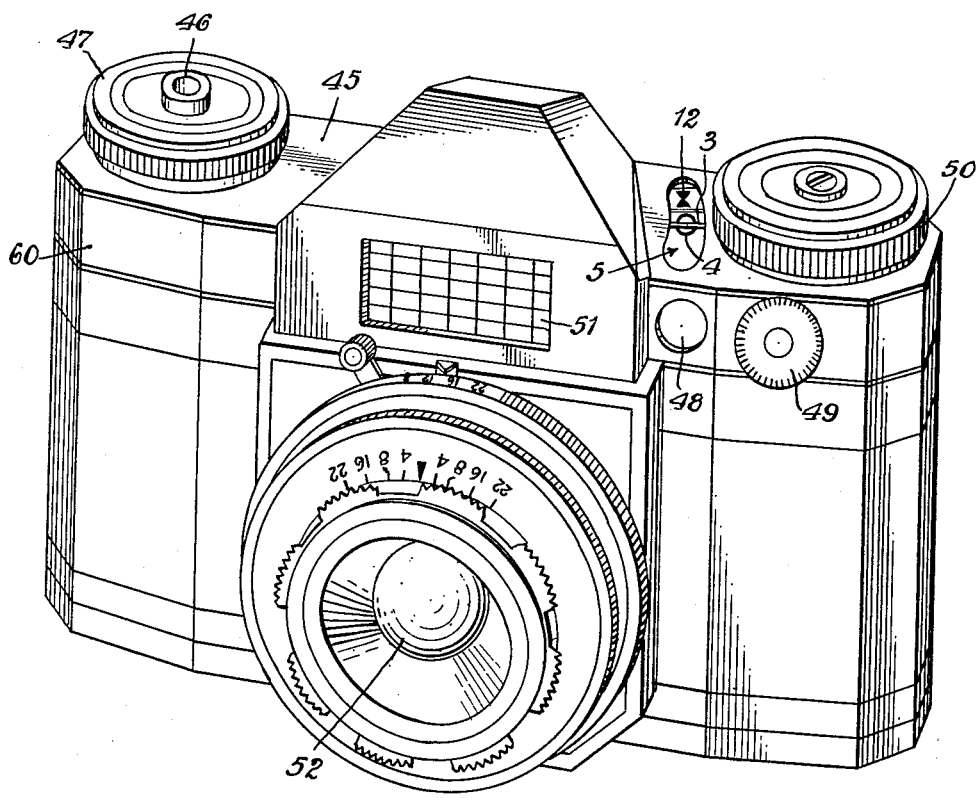

FIG. 8 illustrates diagrammatically a modification of the control of the exposure correcting device when a plurality of correcting marks is employed in the camera;

FIG. 9 illustrates still another embodiment of the control of the exposure correcting device provided with a plurality of correcting marks, and FIG. 10 is a prespective view of a complete camera equipped with a coupled exposure meter and the features of the present invention.

Referring first to FIG. 10, the camera disclosed is provided with a camera casing 60 having a top wall 45, a shutter release member 46, and a film advancing and shutter tensioning knob 47. A window 48 in the front wall of the camera casing 60 serves for increasing the illumination of the interior optical system. A manually rotatable compensating disc 49 is arranged on the front wall of the camera, and finally the camera is also provided with a film rewind knob 50 on the other end of the top wall of the camera casing. The photoelectric cell 51 is arranged directly above the photographic objective 52 in the upper portion of the camera front wall. The camera top wall 45 is also provided with a kidney-shaped window 5 through which the measuring instrument indicator 3 is observed and through which also a fixed indicating mark 4 and a correcting mark 12 is visible.

Referring now to FIG. 1 which shows in an enlarged scale the upper right hand portion of the camera and the parts mounted in the camera casing, it will be noted that the measuring instrument 1 of the exposure meter is provided with an angular indicator 3, 3′ The entire indicating mechanism is mounted in a separate housing 2 which as a unit is mounted into the camera casing 60. A fixed mark 4 of the measuring instrument 1 is adapted to be viewed through the window 5 provided in the top wall 45 of the camera casing 60. This fixed mark 4 has preferably the shape of a circular line. The registration position with the instrument pointer 3 is then obtained when the pointer 3 traverses the circular line diametrically as shown. It will be noted from FIG. 10 that the window 5 in the top wall 45 of the camera casing 60 is kidney-shaped. In the FIGS. 1 and 2 the measuring instrument 1 is constructed as a turn-back instrument which means that after the pointer 3 has been deflected, the entire measuring instrument 1 is rotatably adjusted a distance corresponding to the amount of light which has energized the photoelectric cell and has caused a deflection of the pointer so that the measuring instrument together with the pointer is rotated until the pointer is opposite the stationary mark 40 and traverses this mark diametrically.

This observation of the measuring instrument takes place from above the camera by looking into the window 5, but it is also possible to observe the measuring instrument by looking into the view finder from the rear of the camera. In such a case the observer is not only able to view the image of the subject photographed, but he can also observe an image of the angular portion 3′ of the pointer of the measuring instrument 1 which will be projected into the view finder together with a universally adjustable mask 6 which is provided with a stationary mark permitting a so-called "interior reading" of the measuring instrument. The stationary mark is formed by an aperture 6a in the mask 6. In the embodiment of the invention as illustrated in FIG. 1 there is disclosed, as already stated, a single lens mirror reflex camera in which the view finder produces an upright and true-to-side image of the subject to be photographed. For this purpose there is employed in the finder a penta roof edge prism 29 which has arranged in its front a field lens 30 for making the image of the view finder somewhat brighter. By means of this penta roof edge prism 29 the images of the portion 3' of the indicator 3 and of the aperture 6a in the mask 6 are projected into or adjacent the area where the finder image appears by employing additional optical elements, one of which is a plane or concave mirror 7 which is arranged in such a manner that it directs the light entering the window 48 (FIG. 10) against the parts 3' and 6a, respectively, and then through an aperture 28 into the prism 29. Of course, additional optical elements for increasing the brightness of this beam of light, such as lenses or the like, may be used if desired.

Below the measuring instrument 1 which is rotatable about a vertical axis, there is arranged on a sleeve 9 a gear 8 rotating about the vertical axis of the sleeve 9. This gear 8 is in operative engagement with the compensating wheel 49 (FIG. 10) arranged on the front wall of the camera casing 60. If desired, there may be provided between the gear 8 and the compensating wheel 49 additional transmitting elements. This wheel 49 is used for compensating the adjustment of the measuring instrument, namely in this particular case for bringing the instrument pointer 3 in coincidence with the stationary and horizontally arranged circular line 4 or in alignment with the correcting marks 12 and 12a, the purpose of which will be explained hereinafter. The sleeve 9 is rotatably mounted on a stationary shaft 23.

The upper face of the gear 8 has fixedly attached thereto by rivets 26, 27 or the like, the superimposed cam discs 10 and 11 which likewise are mounted on the sleeve 9 and which therefore rotate with the latter around the stationary shaft 23. The upper cam disc 11 serves in well known manner for compensating the non-linearity of the deflection of the instrument pointer 3, 3'. For this purpose the cam disc 11 is engaged on its circumference by a tracking pin 14 which is fixedly mounted on a toothed sector 18. This toothed sector 18 is rotatably mounted about a pin 19 attached to the bottom wall of the housing 2. In order to permit a pivotal movement of the toothed sector 18 about the pin 19 it is provided with a kidney-shaped slot through which the sleeve 9 passes freely. The toothed sector 18 engages a gear 20 which is arranged in axial alignment with another gear 21; in fact, these two gears 20 and 21 are connected rigidly with each other by an axial screw 21a. This gear assembly 20, 21, 21a is rotatably mounted in the bottom wall of the housing 2 in such a manner that the gear 20 lies on one side of this bottom wall and the gear 21 on the other side. Both gears 20 and 21 rotate always about the same axis. The gear 21 engages a gear 22 attached to the shaft 15 of the measuring instrument. The shaft 15 is reduced at its lower end as shown at 24 and is rotatably supported in an axial bore 25 of the stationary shaft 23. The upper end of the shaft 15 of the measuring instrument is rotatably supported in similar manner in the upper wall of the housing 2.

The cam disc 10 which is rigidly connected with the cam disc 11 and with the gear 8 has such a circumferential shape that it causes a first modification from the circumferential shape of the cam disc 11. The circumference of the cam disc 10 is engaged by a tracking pin 13 which is attached to the carrier 16 for the correcting marks 12 and 12a. The carrier 16 is rotatably mounted on a pin 17 which in turn is attached to the bottom wall of the housing 2. In order to permit a pivotal movement of the carrier 16 about its pin 17, the carrier is provided at the required points with apertures through which the shaft 15 of the measuring instrument and the gear 21 pass freely. The carrier 16 further has at its end opposite its pivot pin 17 two branches 16a and 16b which are provided each with a correcting mark 12 and 12a, respectively. The branch 16a carries the correcting mark 12a for the interior observation of the measuring instrument, while the branch 16b carries a correcting mark 12 which is visible from the exterior of the camera, or more specifically speaking, through the window 5. These correcting marks may have any desired shape, for instance, as shown in FIG. 2. The correcting mark for the exterior observation consists of two triangles of which two corners are arranged directly opposite each other. The pointer 3 of the measuring instrument 1 should be in coincidence with these two opposite corners in its compensated or coincidence position. The correcting marks 12a for the interior observation of the measuring instrument 1 may have the shapes as shown in the FIGS. 4 to 7, inclusive.

The lower cam disc 10 has compared with the basic shape of the cam disc 11 an eccentricity in its circumferential shape which has the result that the correcting marks associated with the same will be arranged at a distance from the stationary mark. This distance of the correcting mark from the stationary mark cannot be a constant one, since a complete compensation of the non-linearity of the deflection of the pointer of the measuring instrument covering all adjustable intervals by means of the cam disc 11 cannot be obtained. The light value intervals which remain are uniform over the entire scale and which correspond each to a complete interval between successive scale divisions of the diaphragm scale are maintained only by a corresponding difference in the position of the correcting mark relatively to the stationary mark. The means for the control and adjustment of the correcting mark is an important feature of the cam disc 10 of this invention. The circumferential shape of the cam disc 10 constitutes a modification (the differential) of the circumferential shape of the cam disc 11 (sensitivity curve of the measuring device).

The operation of the device is as follows:

During a manual rotation of the compensating wheel 49 on the camera a rotation of the gear 8 takes place and this causes a corresponding rotation of the cam discs 10 and 11 which, as explained in the foregoing, are both fixedly connected with the gear 8. During the rotation of the cam disc 11 the pin 14, which by spring means not illustrated is maintained in engagement with the circumference of the cam disc 11, is shifted more or less outwardly and thereby performs a pivotal movement of the toothed sector 18 about its pivot pin 19. The toothed sector 18 performs now a rotation of the gears 20 and 21 and since the gear 21 engages the gear 22, the result is a rearward rotation of the entire measuring instrument 1 and this rotation is continued until the instrument pointer 3 is brought into coincidence with the stationary circular line 4 or with the correcting mark 12.

The cam disc 11 is caused to rotate simultaneously with the cam disc 10 and since the cam disc 10 is engaged by the pin 13 which is maintained in engagement with the circumference of the cam disc 10 by springs or the like, the result is a pivotal movement of the carrier 16 about its pivot pin 17. Since now the correcting marks 12 and 12a are arranged on the carrier 16 as described in the foregoing, it follows that the correcting mark 12 is moved away or toward the stationary mark 4, in fact, if necessary, it is possible to bring the pointer 3 into coincidence with the correcting mark 12. This coincidence position of the pointer 3 with the correcting mark 12 shows that compared with the conventional compensation of the measuring instrument, i.e. compared with the conventional position in which the pointer is brought into coincidence with the stationary mark 4, there has been performed a certain correction in the adjustment of the measuring instrument and this adjustment amounts to one complete diaphragm scale interval or one complete light value scale interval. This coincidence position between the instrument pointer 3 and the correcting mark 12 indicates that either a certain film speed or a certain filter factor has been considered, or the photographer has taken into consideration the bad weather or his intention to photograph a back-lighted subject. This adjustment, therefore, takes into consideration certain factors which influence the exposure of the film. Since now this correction is visible and can be observed by the user of the camera when he looks into the finder, it is practically impossible to make a mistake in the exposure, as when it were necessary for the user of the camera to manipulate other adjusting devices the effect of which cannot be observed in the view finder.

In considering for the exposure adjustment a plurality of exposure prolonging factors, for instance a plurality of filter factors or a plurality of film speeds, the invention provides a plurality of correcting marks the control of which is illustrated in the FIGS. 8 and 9.

Figure 2A:
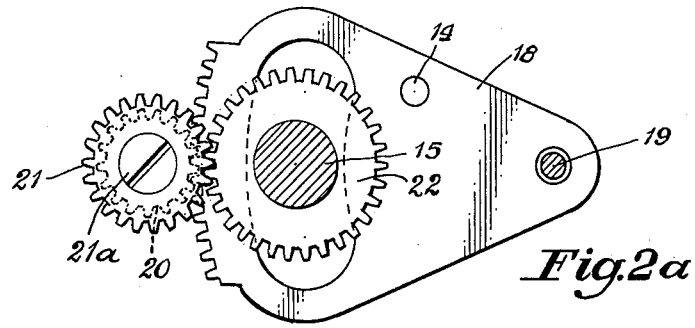
FIGS. 2a and 2b show details of FIGS. 1 and 2.

FIG. 2a is a plan view on the parts 18–22 disclosed in FIG. 2 in a horizontal sectional view and shows the shape and the gearing of those parts. To give a clear picture the lever 16 and the wall of the housing between 16 and 18 have been omitted.

Figure 2B:
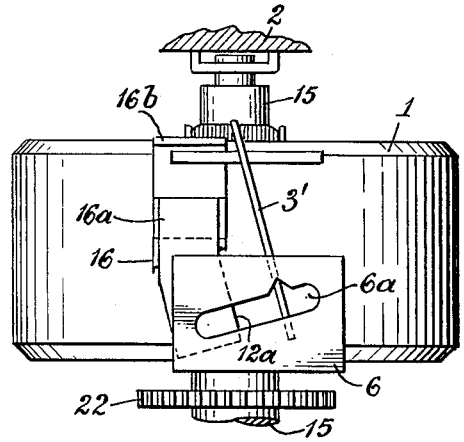

FIG. 2b is a side view of the measuring instrument illustrated in FIGS. 1 and 2 and a plan view of the angular ends of carrier 16 for the correcting mark 12 and of pointer 3. The figure shows that the two angular ends run obliquely to the vertical front wall of the camera casing. The other parts and reference signs correspond to those of the above figures.

Figure 3B:
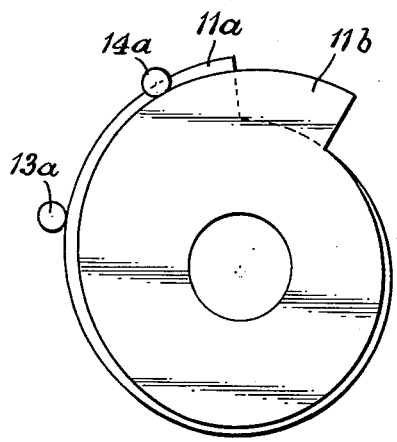
FIGS. 3a and 3b show details of FIG. 3.

The FIGS. 1 and 2 illustrate a measuring device which employs a measuring instrument intended for rotatable adjustment in order that the pointer of the measuring instrument may be brought into coincidence with a stationary mark. FIG. 3, however, illustrates another embodiment of a measuring device in which the measuring instrument proper is substantially stationary and in which the coincidence position is obtained by manually rotating a follow-up pointer which has to be brought into coincidence with the movable pointer of the measuring instrument. The basic difference between the embodiment of the FIGS. 1 and 2 and the one disclosed in FIG. 3 is that the non-linearity of the deflection of the pointer of the measuring instrument is compensated to the fullest extent by a circumferential shape of the cam disc 11b engaged by the tracking pin 14a on the carrier 38 for the follow-up pointer 38a, 38b, which is movable over the indicating area. When the follow-up pointer 38b is brought into coincidence with the instrument pointer 3, the compensated position of the measuring instrument is obtained. The follow-up pointer comprises two branches 38a and 38b arranged on the end of the carrier 38 opposite the pivot pin 14a, and these two branches carry adjusting marks 32a and 32b, respectively. These adjusting marks are, as shown in FIG. 3, constructed in the shape of a circular aperture and when the instrument pointer 3a traverses the circular aperture 32b diametrically, the compensated position can readily be recognized. The carrier for the correcting marks for the interior and exterior reading is designated with 16a. The carrier 16a is controlled in its movement by the lower cam disc 11a, the circumferential shape of which corresponds to the circumferential shape of the cam disc 11. Both cam discs 11a and 11b are rotatably displaced with respect to each other in such a manner that the carrier for the follow-up pointer and the carrier for the correcting marks will be spaced apart in circumferential direction a distance equal, for instance, to one interval of the light value scale or diaphragm aperture scale. The tracking control 13a and the bearing supports 17a for the carrier 16a of the correcting mark is substantially the same in construction and operation as shown in the embodiment shown in FIGS. 1 and 2. The operation of the entire arrangement is such that during the rotation of the gear 8a the cam discs 11b and 11a are also rotated and perform a corresponding shifting of the parts 13a and 16a, respectively. The coincidence position of the instrument pointer 3a with the marks 32b and 32a, respectively, on the follow-up pointer 38 can be obtained without any difficulty. If only one exposure factor has to be considered the coincidence position between the instrument pointer 3a and the respective correcting mark 12 or 12a has to be established. The correcting marks 12 and 12a are arranged with respect to the adjusting marks 32a and 32b of the follow-up pointer 38 a distance apart which corresponds substantially to the distance between the light value intervals or diaphragm aperture value intervals.

Figure 3A:
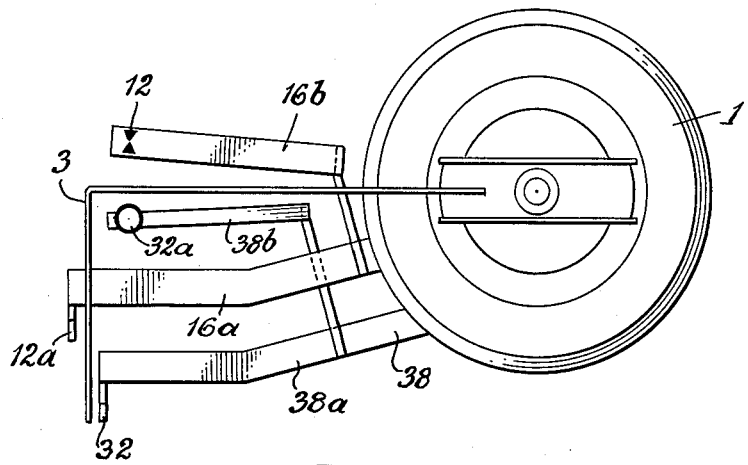
Figure 3:
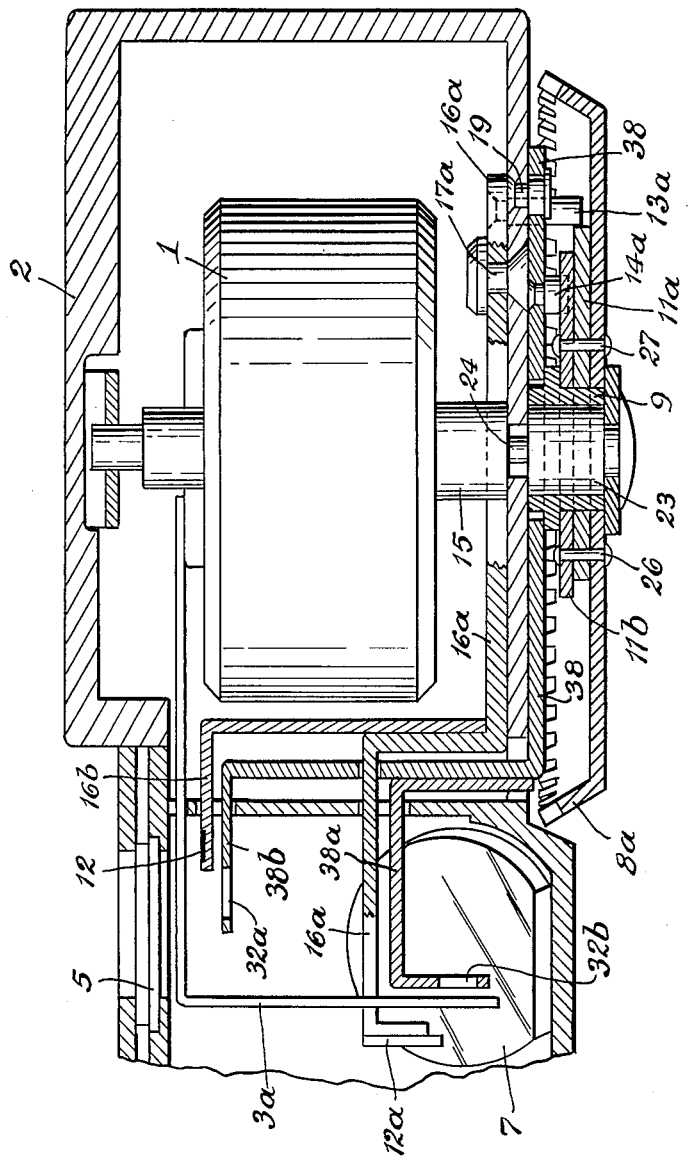
FIG. 3 is a vertical sectional view of a single lens mirror reflex camera similar to FIG. 1 except that the exposure meter is provided with a stationary measuring instrument and with a manually adjustable follow-up pointer.

FIG. 3a shows the measuring instrument with pointer 3, the carriers 38a and 38b for the follow-up marks 32 and 32a and finally the carriers 16 and 16a for the correcting marks 12a and 12, the follow-up mark 32a and the correcting mark 12 being for the exterior reading and the follow-up mark 32 and the correcting mark 12a being for the interior reading by way of projection into the finder image. The part of the instrument pointer 3 running parallel to the camera top surface works with the external reading while the angular end works with the interior reading. The carriers 16b and 38b are branches of the carriers 16a and 38.

As is to be seen in FIG. 3b the control and cam discs 11b and 11a, shown in FIG. 3 in a side view, for the control of the carriers 38a, 38b, and 16a, 16b are arranged in a way that the above mentioned carriers have on their course a difference of one light value interval or one diaphragm aperture respectively. FIG. 3b is a top view on the cam discs 11b and 11a where the scanning pins 13a and 14a are to be seen. As shown in FIG. 3, 13a is positioned on carrier 16a and controls it in accordance with the cam surface and 14a is fixed at carrier 38.

Figures 4, 5, 6, 7:
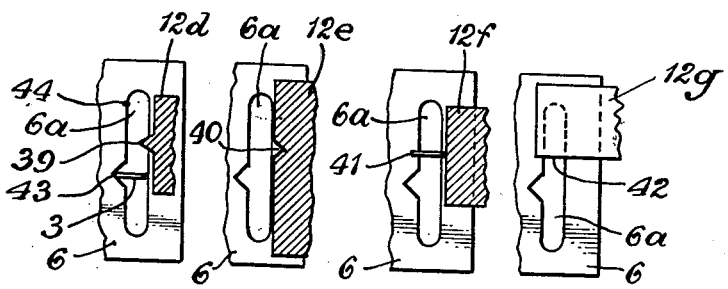

The FIGS. 4, 5, 6 and 7 show a number of possible forms of stationary marks which cooperate with reference figures, the outlines of which are clearly illustrated. The marks shown in these FIGS. 4 to 7 appear either adjacent the view finder image or within the area of the view finder image. These marks consist of images of stationary marks consisting of an aperature 6a of a mask 6 which aperture is illustrated by the outline 44. This aperture 6a is provided with a sight notch-like recess 43 which notch is traversed by an image of a portion of the pointer 3 when the measuring instrument has been adjusted to the correct coincidence position. In the conventional coincidence position of the camera, in which no exposure prolongation factor is used, the image of the instrument pointer 3 as shown in FIG. 4 will intersect the point of the sight notch-like recess 43. If, however, an exposure prolongation factor has to be considered, then the image of the instrument pointer 3 will not traverse the notch 43 of the stationary mark but will traverse the image of the correcting mark.

According to FIG. 4, the correcting mark 12d consists of a surface element provided on one side with a pointed projection 39.

According to FIG. 5, the correcting mark in the form of a surface element 12e is provided with a sight notch-like recess 40 on one side.

According to FIG. 6, the surface element 12f is provided with a pointer-like index 41 on one side, while according to FIG. 7 it is necessary when considering an exposure prolongation factor to adjust the instrument pointer 3 in a manner that it comes to lie along the edge 42 of the correcting mark 12g. Preferably differently colored areas may be employed in order to improve the visibility of the correcting marks.

If it is desired to employ a plurality of prolongation factors, for instance a plurality of film speeds or a plurality of filter factors, then a plurality of correcting marks is necessary which should be spaced from one another a distance equal to a full scale interval of, for instance, a light value scale or a full scale interval of a diaphragm aperture scale. The corresponding control of the carriers having these correcting marks thereon in measuring devices which employ a fixed mark is diagrammatically illustrated in the FIGS. 8 and 9, respectively.

According to FIG. 8 the carriers 16c and 33c, which carry the correcting marks 12c and 34c, are controlled each by their own cam disc 10c and 36c, respectively, which are arranged rotatably displaced with respect to one another in such a manner that the adjusting difference between the correcting marks consists, for instance, of one full scale interval of a diaphragm aperture scale. The cam discs 10c and 36c are engaged by corresponding tracking pins 13c and 37c respectively, while the stationary mark is designated with 4c. Both carriers 16c and 33c are pivotally mounted about a common pivot pin 17c.

According to FIG. 9 the two carriers 16c and 33c are controlled by a single cam disc 10d. The shifting difference of these two carriers 16d and 33d is produced by a corresponding different transmission effected by the cam disc 10d and the respective carriers. According to FIG. 9 this different transmission is accomplished by having the tracking pins 13d and 35d engage different portions of the perimeter of the cam disc 10d. It will be noted that the distance of the tracking pins 13d and 35d from the common pivot pin 17d of the two carriers is different.

The coupling of the exposure meter to one of the exposure control elements diaphragm aperture or shutter speed or to both has not been illustrated in the application as this may be designed according to the coupling possibilities shown in U.S. patent applications Ser. No. 775,933, FIG. 1 dated November 24, 1958, now Patent No. 3,045,570, and Ser. No. 699,118, FIG. 1 dated November 26, 1957, now Patent No. 3,004,480.

In the above applications the time setting element is connected over the aperture setting element to the exposure meter as both setting elements are coupled together by means of a differential.

What I claim is:

1. In a single lens mirror reflex camera provided with a camera casing having mounted therein a photoelectric exposure meter which is coupled with the exposure adjusting devices of the camera, a view finder in said camera casing, said exposure meter including an electrical measuring instrument having a movable indicating pointer cooperating with a predetermined mark which when in coincidence with said pointer indicates a predetermined adjustment of said exposure adjusting devices of the camera, an additional mark indicating a predetermined exposure prolongation factor spaced from said first mark and which is adapted to be brought into coincidence with said pointer, means for adjusting said additional mark relatively to said first mark, and means for projecting an image of a portion of said pointer and images representing said mark and said additional mark into said view finder for observation simultaneously with an image of the subject to be photographed.

2. In a photographic camera provided with a photoelectric exposure meter coupled with the exposure adjusting devices of the camera, said exposure meter including an electrical measuring instrument having a movable indicating pointer cooperating with a mark which when in coincidence with said pointer indicates a predetermined adjustment of the exposure adjusting devices, an additional mark indicating a predetermined exposure prolongation factor spaced from said first mark and which is adapted to be brought into coincidence with said pointer, said first mark being arranged on a stationary member and said additional mark being mounted on a pivotally mounted carrier, and means including a rotatably mounted cam disc for adjusting said carrier relatively to said first mark, said cam disc having a curved perimeter which also compensates the nonlinear deflection of the pointer of said measuring instrument.

3. In a single lens mirror reflex camera provided with a camera casing having mounted therein a photoelectric exposure meter which is coupled with the exposure adjusting devices of the camera, a view finder in said camera casing, said exposure meter including an electrical measuring instrument having a movable indicating pointer cooperating with a predetermined mark which when in coincidence with said pointer indicates a predetermined adjustment of said exposure adjusting devices of the camera, an additional mark indicating a predetermined exposure-prolongation factor spaced from said first mark and which is adapted to be brought into coincidence with said pointer, means for projecting an image of a portion of said pointer and images representing said mark and said additional mark into said view finder for observation simultaneously with an image of the subject to be photographed, said first mark being arranged on a horizontal stationary portion of said camera, while said measuring instrument including its pointer is rotatably mounted about a vertical axis, a carrier having said additional mark thereon pivotally loacated in said camera to move about an axis parallel to said vertical axis, and two superimposed cam discs fixedly attached to one another and rotatably adjustable about said vertical axis, and means operatively connecting one of said cam discs with said measuring instrument and the other one of said cam discs with said carrier for rotatably adjusting the same about their respective axes.

4. A photographic camera according to claim 3, in which a second fixed mark is arranged within said camera in a position to permit an image of the same to be projected into said view finder, and in which the pointer of said measuring instrument extends with a bent portion thereof into the neighborhood of said second fixed mark, and means for projecting an image of said bent portion of said pointer into said view finder.

5. A photographic camera according to claim 3, in which a second fixed mark is arranged within said camera in a position to permit an image of the same to be projected into said view finder, and in which the pointer of said measuring instrument extends with a bent portion thereof into the neighborhood of said second fixed mark, and means for projecting an image of said bent portion of said pointer into said view finder, said carrier being provided at its end opposite its pivot axis with two spaced arms, one of which carrying said additional mark and extending above the horizontal portion of the camera having said first mark arranged thereon, the other arm of said carrier extending into the neighborhood of said bent portion of said instrument pointer and having a second additional mark thereon, an image of which is adapted to be projected into said view finder.

6. A photographic camera according to claim 1, in which said first mark is arranged on an adjustable follow-up pointer rotatably mounted in the camera, a manually adjustable cam disc operatively connected with said follow-up pointer which latter is caused to be brought with its mark thereon into coincidence with said instrument pointer, said follow-up pointer carrying on a branched off portion thereof another mark extending into the neighborhood of said view finder, another cam disc arranged to rotate with said first mentioned cam disc and operatively connected with a pivotally mounted carrier having said additional mark thereon, said carrier having a branched off portion thereon carrying a second additional mark extending into the neighborhood of said view finder, and means for projecting images of said other mark and said second additional mark into said view finder.

7. A photographic camera according to claim 3, including two carriers provided each with an additional mark and each pivotally mounted about the same pivot axis, and a separate cam disc for each said carriers and fixedly connected with the other cam disc controlling the adjustment of said rotatably mounted measuring instrument.

8. A photographic camera according to claim 3, including two carriers provided each with an additional mark and each pivotally mounted about the same pivot axis, and a single cam disc for both said carriers and fixedly connected with the other cam disc controlling the adjustment of said rotatably mounted measuring instrument, said two carriers being adjusted by said single cam disc in a manner that the two additional marks will be arranged in spaced relation from each other.

References Cited in the file of this patent
UNITED STATES PATENTS

| | | |
|---|---|---|
| 2,242,043 | Sanger | May 13, 1941 |
| 2,250,898 | Tonnies | July 29, 1941 |
| 2,305,294 | Kuppenbender | Dec. 15, 1942 |
| 2,933,991 | Sauer | Apr. 26, 1960 |
| 2,953,978 | Rentschler | Sept. 27, 1960 |